US010809978B2

(12) United States Patent
Redfern et al.

(10) Patent No.: US 10,809,978 B2
(45) Date of Patent: Oct. 20, 2020

(54) MERGE SORT ACCELERATOR

(71) Applicant: TEXAS INSTRUMENTS INCORPORATED, Dallas, TX (US)

(72) Inventors: Arthur John Redfern, Plano, TX (US); Asheesh Bhardwaj, Allen, TX (US); Tarek Aziz Lahlou, Plano, TX (US); William Franklin Leven, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 136 days.

(21) Appl. No.: 15/995,647

(22) Filed: Jun. 1, 2018

(65) Prior Publication Data

US 2018/0349096 A1    Dec. 6, 2018

Related U.S. Application Data

(60) Provisional application No. 62/514,353, filed on Jun. 2, 2017.

(51) Int. Cl.

| | |
|---|---|
| *G06F 16/00* | (2019.01) |
| *G06F 7/36* | (2006.01) |
| *G06F 9/30* | (2018.01) |
| *G06F 7/32* | (2006.01) |
| *G06F 7/24* | (2006.01) |

(Continued)

(52) U.S. Cl.
CPC ............... *G06F 7/36* (2013.01); *G06F 7/16* (2013.01); *G06F 7/24* (2013.01); *G06F 7/32* (2013.01); *G06F 9/30036* (2013.01); *G06F 16/284* (2019.01)

(58) Field of Classification Search
CPC .......... G06F 16/2246; G06F 16/24578; G06F 16/322; G06F 16/9027; G06F 7/36; G06F 7/16; G06F 7/24; G06F 7/32; G06F 9/30036; G06F 16/284; G06F 9/30021; G06F 9/30032; G06F 9/3877
See application file for complete search history.

(56) References Cited

U.S. PATENT DOCUMENTS

| | | | | |
|---|---|---|---|---|
| 4,890,220 | A | * | 12/1989 | Nakagawa .......... G06F 9/30021 712/8 |
| 8,380,621 | B1 | * | 2/2013 | Bent ...................... G06Q 40/02 705/35 |

(Continued)

*Primary Examiner* — Noosha Arjomandi
(74) *Attorney, Agent, or Firm* — Ebby Abraham; Charles A. Brill; Frank D. Cimino

(57) ABSTRACT

A merge sort accelerator (MSA) includes a pre-processing stage configured to receive an input vector and generate a pre-processing output vector based on a pre-processing instruction and the input vector. The MSA also includes a merge sort network having multiple sorting stages configured to be selectively enabled. The merge sort network is configured to receive the pre-processing output vector and generate a sorted output vector based on a sorting instruction and the pre-processing output vector. The MSA includes an accumulator stage configured to receive the sorted output vector and update an accumulator vector based on the accumulator instruction and the sorted output vector. The MSA also includes a post-processing stage configured to receive the accumulator vector and generate a post-processing output vector based on a post-processing instruction and the accumulator vector.

14 Claims, 9 Drawing Sheets

(51) Int. Cl.
*G06F 7/16* (2006.01)
*G06F 16/28* (2019.01)

(56) References Cited

U.S. PATENT DOCUMENTS

| | | | | |
|---|---|---|---|---|
| 9,269,041 | B2* | 2/2016 | McCormick | G06N 3/04 |
| 9,652,803 | B2* | 5/2017 | Lane | G06Q 40/04 |
| 9,903,958 | B2* | 2/2018 | Sjolin | G01N 23/04 |
| 10,146,738 | B2* | 12/2018 | Nurvitadhi | G06F 15/8069 |
| 10,180,928 | B2* | 1/2019 | Nurvitadhi | G06F 9/3001 |
| 10,270,464 | B1* | 4/2019 | Guilford | H03M 7/40 |
| 2008/0082468 | A1* | 4/2008 | Long | G06K 9/00147 |
| | | | | 706/12 |
| 2012/0158774 | A1* | 6/2012 | Balkesen | G06F 17/10 |
| | | | | 707/769 |
| 2014/0006411 | A1* | 1/2014 | Boldyrev | G06F 16/2272 |
| | | | | 707/741 |
| 2014/0136754 | A1* | 5/2014 | Hyde | G06F 12/0246 |
| | | | | 711/103 |
| 2015/0143078 | A1* | 5/2015 | Khan | G06F 15/8053 |
| | | | | 712/7 |
| 2015/0347475 | A1* | 12/2015 | Kimura | G06F 9/30109 |
| | | | | 707/752 |
| 2017/0083827 | A1* | 3/2017 | Robatmili | G06N 20/00 |
| 2017/0200094 | A1* | 7/2017 | Bruestle | G06F 5/01 |
| 2018/0246855 | A1* | 8/2018 | Redfern | G06F 17/16 |
| 2018/0253402 | A1* | 9/2018 | Redfern | G06F 17/16 |
| 2018/0314926 | A1* | 11/2018 | Schwartz | G06N 3/063 |
| 2019/0188241 | A1* | 6/2019 | Fick | G06N 20/00 |

* cited by examiner

| OUTPUT INDEX | INPUT ASSESSMENT | INSTRUCTION | OUTPUT | DECISION | NEXT INPUT ASSESSMENT |
|---|---|---|---|---|---|
| 0 | [_, 0, 1] | CURRENT | 0 | ADVANCE | [0, 1, 2] |
| 1 | [0, 1, 2] | CURRENT | 1 | ADVANCE | [1, 2, 3] |
| 2 | [1, 2, 3] | CURRENT | 2 | ADVANCE | [2, 3, 4] |
| 3 | [2, 3, 4] | PREVIOUS | 2 | DO NOT ADVANCE | [2, 3, 4] |
| 4 | [2, 3, 4] | PREVIOUS | 2 | DO NOT ADVANCE | [2, 3, 4] |
| 5 | [2, 3, 4] | CURRENT | 3 | ADVANCE | [3, 4, 5] |
| 6 | [3, 4, 5] | CURRENT | 4 | ADVANCE | [4, 5, 6] |
| 7 | [4, 5, 6] | PREVIOUS | 4 | DO NOT ADVANCE | [4, 5, 6] |
| 8 | [4, 5, 6] | PREVIOUS | 4 | DO NOT ADVANCE | [4, 5, 6] |
| 9 | [4, 5, 6] | CURRENT | 5 | ADVANCE | [5, 6, 7] |
| 10 | [5, 6, 7] | CURRENT | 6 | ADVANCE | [6, 7, 8] |
| 11 | [6, 7, 8] | PREVIOUS | 6 | DO NOT ADVANCE | [6, 7, 8] |
| 12 | [6, 7, 8] | PREVIOUS | 6 | DO NOT ADVANCE | [6, 7, 8] |
| 13 | [6, 7, 8] | CURRENT | 7 | ADVANCE | [7, 8, 9] |
| 14 | [7, 8, 9] | CURRENT | 8 | ADVANCE | [8, 9, 10] |
| 15 | [8, 9, 10] | PREVIOUS | 8 | DO NOT ADVANCE | [8, 9, 10] |

FIG. 2a

| OUTPUT INDEX | INPUT ASSESSMENT | INSTRUCTION | OUTPUT | DECISION | NEXT INPUT ASSESSMENT |
|---|---|---|---|---|---|
| 0 | [_, 0, 1] | SPECIAL | ASDF | DO NOT ADVANCE | [_, 0, 1] |
| 1 | [_, 0, 1] | CURRENT | 0 | ADVANCE | [0, 1, 2] |
| 2 | [0, 1, 2] | NEXT | 2 | DO NOT ADVANCE | [0, 1, 2] |
| 3 | [0, 1, 2] | CURRENT | 1 | ADVANCE | [1, 2, 3] |
| 4 | [1, 2, 3] | PREVIOUS | 1 | DO NOT ADVANCE | [1, 2, 3] |
| 5 | [1, 2, 3] | NEXT | 3 | DO NOT ADVANCE | [1, 2, 3] |
| 6 | [1, 2, 3] | CURRENT | 2 | ADVANCE | [2, 3, 4] |
| 7 | [2, 3, 4] | SPECIAL | ASDF | DO NOT ADVANCE | [2, 3, 4] |
| 8 | [2, 3, 4] | CURRENT | 3 | ADVANCE | [3, 4, 5] |
| 9 | [3, 4, 5] | CURRENT | 4 | ADVANCE | [4, 5, 6] |
| 10 | [4, 5, 6] | NEXT | 6 | DO NOT ADVANCE | [4, 5, 6] |
| 11 | [4, 5, 6] | PREVIOUS | 4 | DO NOT ADVANCE | [4, 5, 6] |
| 12 | [4, 5, 6] | CURRENT | 5 | ADVANCE | [5, 6, 7] |
| 13 | [5, 6, 7] | CURRENT | 6 | ADVANCE | [6, 7, 8] |
| 14 | [6, 7, 8] | SPECIAL | ASDF | DO NOT ADVANCE | [6, 7, 8] |
| 15 | [6, 7, 8] | SPECIAL | ASDF | DO NOT ADVANCE | [6, 7, 8] |
| 16 | [6, 7, 8] | CURRENT | 8 | ADVANCE | [8, 9, 10] |

LOAD CONTROL - PER STAGE SUMMARY

| STAGE (s) | OPERATION | CONTROL BITS ($b_s$) | NOTES |
|---|---|---|---|
| 0 | PRE PROCESSING | 64 | 32 ELEMENTS, 2 BITS PER ELEMENT (PREVIOUS, CURRENT, NEXT, SPECIAL) |
| 1 | COMPARE 2 | 32 | 16 ELEMENTS, 2 BITS PER ELEMENT (PREVIOUS, CURRENT, FORCE SWAP, PASS THROUGH) |
| 2 | MERGE 4 | 16 | 8 ELEMENTS, 2 BITS PER ELEMENT (PREVIOUS, CURRENT, FORCE SWAP, PASS THROUGH) |
| 3 | MERGE 8 | 8 | 4 ELEMENTS, 2 BITS PER ELEMENT (PREVIOUS, CURRENT, FORCE SWAP, PASS THROUGH) |
| 4 | MERGE 16 | 4 | 2 ELEMENTS, 2 BITS PER ELEMENT (PREVIOUS, CURRENT, FORCE SWAP, PASS THROUGH) |
| 5 | MERGE 32 | 2 | 1 ELEMENT, 2 BITS PER ELEMENT (PREVIOUS, CURRENT, FORCE SWAP, PASS THROUGH) |
| 6 | ACCUMULATE | 64 | 32 ELEMENTS, 2 BITS PER ELEMENT (KEEP, STORE, MIN, MAX) |
| 7 | POST PROCESSING | 64 | 32 ELEMENTS, 1 BIT PER ELEMENT (DISCARD, KEEP; SPECIAL, KEEP) |
| 8 | STORE | 32 | 32 ELEMENTS, 1 BIT PER ELEMENT (DISCARD, STORE) |

FIG. 5

MERGE SORT ACCELERATOR

CROSS-REFERENCE TO RELATED APPLICATIONS

The present application claims priority to U.S. Provisional Patent Application No. 62/514,353, which was filed Jun. 2, 2017, is titled "The Merge Sort Accelerator PAC (MSA-PAC)," and is hereby incorporated herein by reference in its entirety.

BACKGROUND

The present subject matter relates generally to hardware acceleration. Hardware accelerators may be employed to perform certain mathematical operations more efficiently than on a general-purpose host processor such as a central processing unit (CPU). For example, a matrix multiplication accelerator (MMA) efficiently accelerates all linear operations. However, the space of mathematical operations includes other operations that are not able to be performed by the MMA.

SUMMARY

In accordance with at least one example of the disclosure, a merge sort accelerator includes a pre-processing stage, a merge sort network comprising multiple sorting stages configured to be selectively enabled, an accumulator stage comprising an accumulator vector, and a post-processing stage. The pre-processing stage is configured to receive an input vector; receive a pre-processing instruction that indicates, for each element of a pre-processing output vector, a mapping from an element of the input vector to the pre-processing output vector; and generate the pre-processing output vector based on the pre-processing instruction and the input vector. The merge sort network is configured to receive the pre-processing output vector; receive a sorting instruction that indicates which, if any, sorting stages are enabled and, for those sorting stages that are enabled, a type of sorting to be applied to the pre-processing output vector; and generate a sorted output vector based on the sorting instruction and the pre-processing output vector. The accumulator stage is configured to receive the sorted output vector; receive an accumulator instruction that indicates whether to replace the accumulator vector with the sorted output vector or compare the sorted output vector with the accumulator vector and replace the accumulator vector with a result of the comparison; and update the accumulator vector based on the accumulator instruction and the sorted output vector. The post-processing stage is configured to receive the accumulator vector; receive a post-processing instruction that indicates a selection of elements of the accumulator vector and a position in a post-processing output vector for each of the selected elements; and generate the post-processing output vector based on the instruction and the accumulator vector.

Other examples of the present disclosure are directed to a method for accelerating mathematical operations. The method includes pre-processing an input vector comprising multiple analysis groups to expand each of the analysis groups to a number of elements equal to a power of 2, resulting in a pre-processing output vector. The method also includes sorting at least a portion of the pre-processing output vector, resulting in a sorted output vector; sorting corresponding elements of two or more sorted output vectors, resulting in an accumulator vector; and selecting elements of the accumulator vector and generating a post-processing output vector comprising the selected elements.

Yet other examples of the present disclosure are directed to a merge sort accelerator that includes a pre-processing stage configured to pre-process an input vector comprising multiple analysis groups to expand each of the analysis groups to a number of elements equal to a power of 2, resulting in a pre-processing output vector. The merge sort accelerator also includes a merge sort network configured to sort at least a portion of the pre-processing output vector, resulting in a sorted output vector; an accumulator stage configured to sort corresponding elements of two or more sorted output vectors, resulting in an accumulator vector; and a post-processing stage configured to select elements of the accumulator vector and generate a post-processing output vector comprising the selected elements.

BRIEF DESCRIPTION OF THE DRAWINGS

For a detailed description of various examples, reference will now be made to the accompanying drawings in which:

FIG. 2a shows a table of sample inputs and resulting outputs for a pre-processing stage of the merge sort accelerator in accordance with various examples;

FIG. 2b shows another table of sample inputs and resulting outputs for the pre-processing stage of the merge sort accelerator in accordance with various examples;

FIG. 5 shows a table of per-stage instruction examples for the merge sort accelerator;

DETAILED DESCRIPTION

As explained above, current hardware accelerators such as a matrix multiplication accelerator (MMA) efficiently accelerate all linear operations. However, the space of mathematical operations includes other operations that are not able to be performed by the MMA.

In accordance with the disclosed examples, a merge sort accelerator and a method for merge sort acceleration provide a hardware solution to carry out multiple functions on a dataset including min, max, sort, median, rank, pool, and find. The merge sort accelerator of the present disclosure performs the aforementioned functions more efficiently then software executed by a host processor, for example. Further, examples of the present disclosure may utilize an instruction control section that allows for a high degree of configurability of operation of the merge sort accelerator to handle datasets including both regular patterns as well as irregular patterns. These functions may be useful in many varying contexts, such as max pooling for convolutional neural networks, find for radar-based applications, or median filtering for image processing.

Figure 1A:
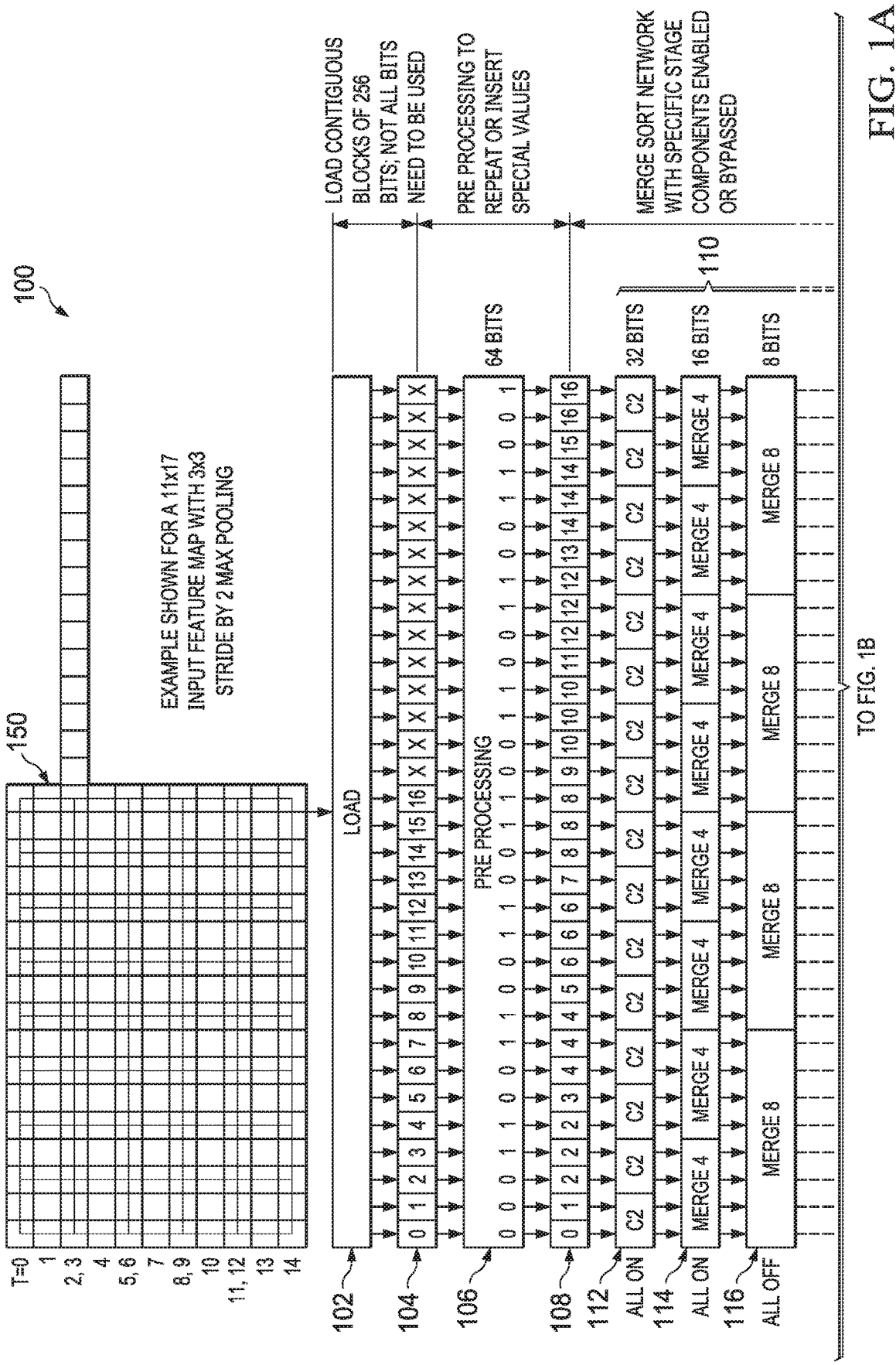
FIGS. 1A and 1B show a block diagram of a merge sort accelerator in accordance with various examples.
Figure 1B:
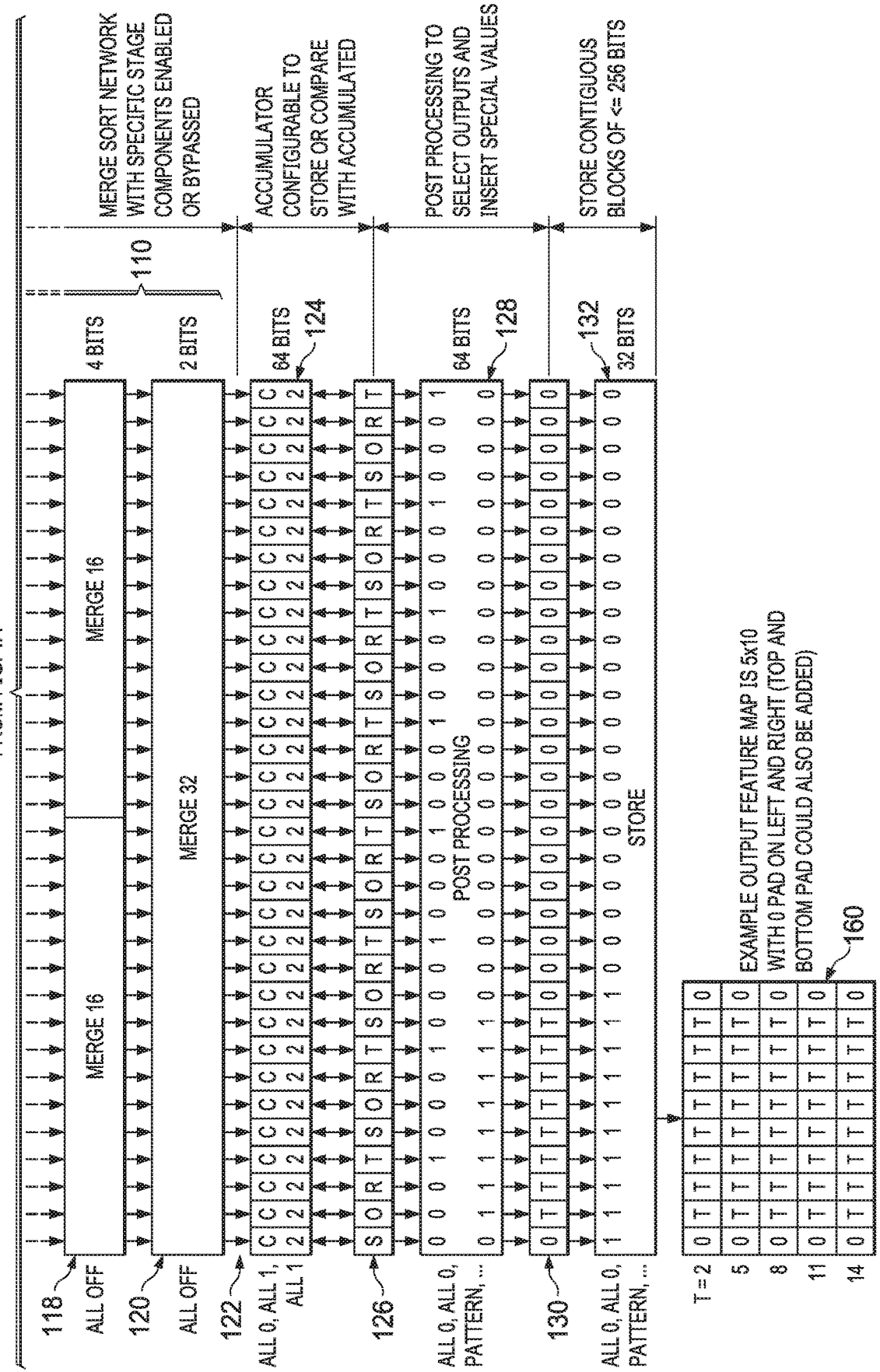

FIGS. 1A and 1B show a merge sort accelerator 100 in accordance with examples of the present disclosure. Generally, the merge sort accelerator 100 receives or reads in data from an input memory 150 and provides or outputs data to a memory 160 (e.g., random access memory (RAM), local memory such as a cache associated with a host processor). In certain examples, the memory 150 and the memory 160 may comprise different portions of one physical memory, while in other examples each of the memory 150 and the memory 160 may comprise separate physical memories.

The merge sort accelerator may comprise a load stage 102, which is configured to load data from the memory 150. As shown in FIG. 1A, the load stage 102 generates 32 elements, which may each be, for example, one byte in size; the elements generated by the load stage 102 may be referred to as an input vector 104. Further, the load stage 102 need not necessarily receive as many elements as it generates, as is the case in FIG. 1A where the memory 150 contains only 17 elements per row. Thus, in FIG. 1A, the load stage 102 loads the 17 elements from the memory 150, with the remaining 15 elements being "don't care" elements. For the sake of simplicity, FIGS. 1A and 1B and the associated examples are described with respect to "rows" and "columns" of data elements, although the merge sort accelerator 100 is not limited to any particular directionality of data, and is more generally applicable to, for example, one-dimensional vectors of data elements and, as will be explained below, analysis in a second dimension (i.e., across multiple one-dimensional vectors).

An instruction control section, described in further detail below, provides various instructions to the remaining stages of the merge sort accelerator 100 to control the functionality of those stages. Continuing, the merge sort accelerator 100 also comprises a pre-processing stage 106, which is configured to receive the input vector 104 and generate a pre-processing output vector 108. The pre-processing stage 106 receives a pre-processing instruction that indicates a mapping from the input vector 104 to the pre-processing output vector 108. For example, the pre-processing instruction may specify for each element of the pre-processing output vector 108 whether that element is a "previous" element of the input vector 104, a "current" element of the input vector 104, a "next" element of the input vector 104, or a "special value." The pre-processing stage 106 is configured to read elements of the input vector 104 sequentially in order to generate the pre-processing output vector 108 as prescribed by the pre-processing instruction. FIG. 2a shows a table that demonstrates the functionality of the pre-processing stage 106 in response to a pre-processing instruction.

In FIG. 2a, the "output index" column refers to the index of a particular pre-processing output vector 108 element; in this example, for the sake of brevity, only the first 16 elements (i.e., indices 0 through 15) of the 32-element pre-processing output vector 108 are specified. The "input assessment" column refers to the indices of the input vector 104 that are being considered for the given pre-processing output vector 108 element. The "instruction" column refers to the pre-processing instruction for the given pre-processing output vector 108 element (i.e., previous, current, next, or special). The "output" column refers to the value (in this case, a reference to the input vector 104 index) of the given pre-processing output vector 108 element that results from the input vector 104 and the pre-processing instruction. The "decision" column refers to the action taken regarding the input assessment to generate the next input assessment, which is reflected in the "next input assessment" column; the action taken is whether to advance the elements of the input vector 104 being assessed. The elements of the input vector 104 to be assessed in the following cycle are advanced when the instruction is "current," and are not advanced when the instruction is "previous," "next," or "special."

Referring briefly back to FIG. 1A, the example of analyzing the data in the memory 150, shown as an 11-row× 17-column feature map (e.g., an image), involves organizing the feature map in a 3×3 stride by 2, for max pooling. For example, elements are analyzed in 3×3 blocks, which have an overlap with adjacent blocks of 1. Sorting algorithms typically work on groups equal to powers of 2 since sorting compares two elements at a time, and thus each group of three elements in a given row that corresponds to a 3×3 block are expanded to, for example, four elements for the purposes of sorting those elements. In the example of FIG. 2a, the instructions are arranged to carry out such expansion of three elements to a power-of-2 value, namely four elements.

For example, referring to the first row of table 200, output index 0, the first input assessment includes no previous element, since none is available, a current element of input vector 104 index 0, and a next element of input vector 104 index 1. The instruction for output index 0 is current, and therefore the output value is input vector 104 index 0. As explained, for the instruction "current," the decision is to advance the input assessment for the next cycle, and thus for output index 1, the input assessment is a previous element of input vector 104 index 0, a current element of input vector 104 index 1, and a next element of input vector 104 index 2. Output indices 1 and 2 are determined in a similar manner.

Turning to output index 3, the input assessment has been advanced to a previous element of input vector 104 index 2, a current element of input vector 104 index 3, and a next element of input vector 104 index 4. The instruction for output index 3 is previous, and therefore the output value is input vector 104 index 2. Since the instruction is "previous," the input assessment is not advanced for the next cycle. Output index 4 is similar to output index 3, and then the instruction returns to current for output index 5 and continues as shown in FIG. 2a. It should be appreciated that the pattern of instructions in FIG. 2a results in the expansion of input indices 0-1-2 to an output of 0-1-2-2 (i.e., expanding three elements to four elements), and the expansion of the next three input indices of 2-3-4, having an overlap of 1, to 2-3-4-4; this pattern is repeated such that each group of three input indices is expanded to four elements in the pre-processing output vector 108.

FIG. 2b shows a table 210 that demonstrates that for "previous," "next," and "special" instructions, the input assessment is not advanced and, in particular for the "special" instruction, the output value is not necessarily the value of any of the input indices. As shown, the output that results from the "special" instruction is "ASDF," which is a generic value meant to clearly differentiate those outputs from the output values generated from the input assessment in response to the "previous," "current," and "next" instructions. The general functionality displayed in FIG. 2b is similar to that in FIG. 2a, although the instruction pattern itself is different.

Referring back to FIG. 1A, the resultant pre-processing output vector 108 from the pre-processing stage 106, with the instructions applied as demonstrated in FIG. 2a includes elements grouped into a power-of-2, namely groups of four elements. The merge sort accelerator 100 also comprises a merge sort network 110, which is configured to receive the pre-processing output vector 108 from the pre-processing stage 106. As shown, the merge sort network 110 comprises a compare 2 stage 112, a merge 4 stage 114, a merge 8 stage 116, a merge 16 stage 118, and a merge 32 stage 120. The various stages of the merge sort network 110 are configured to be selectively enabled, allowing a sorted output vector 122 to be generated that includes varying level of sorting; for example, the merge sort network 110 can perform a range of sorting from pairs of adjacent elements of the pre-processing output vector 108 to the entire 32 elements of the pre-processing output vector 108.

Figure 3A:
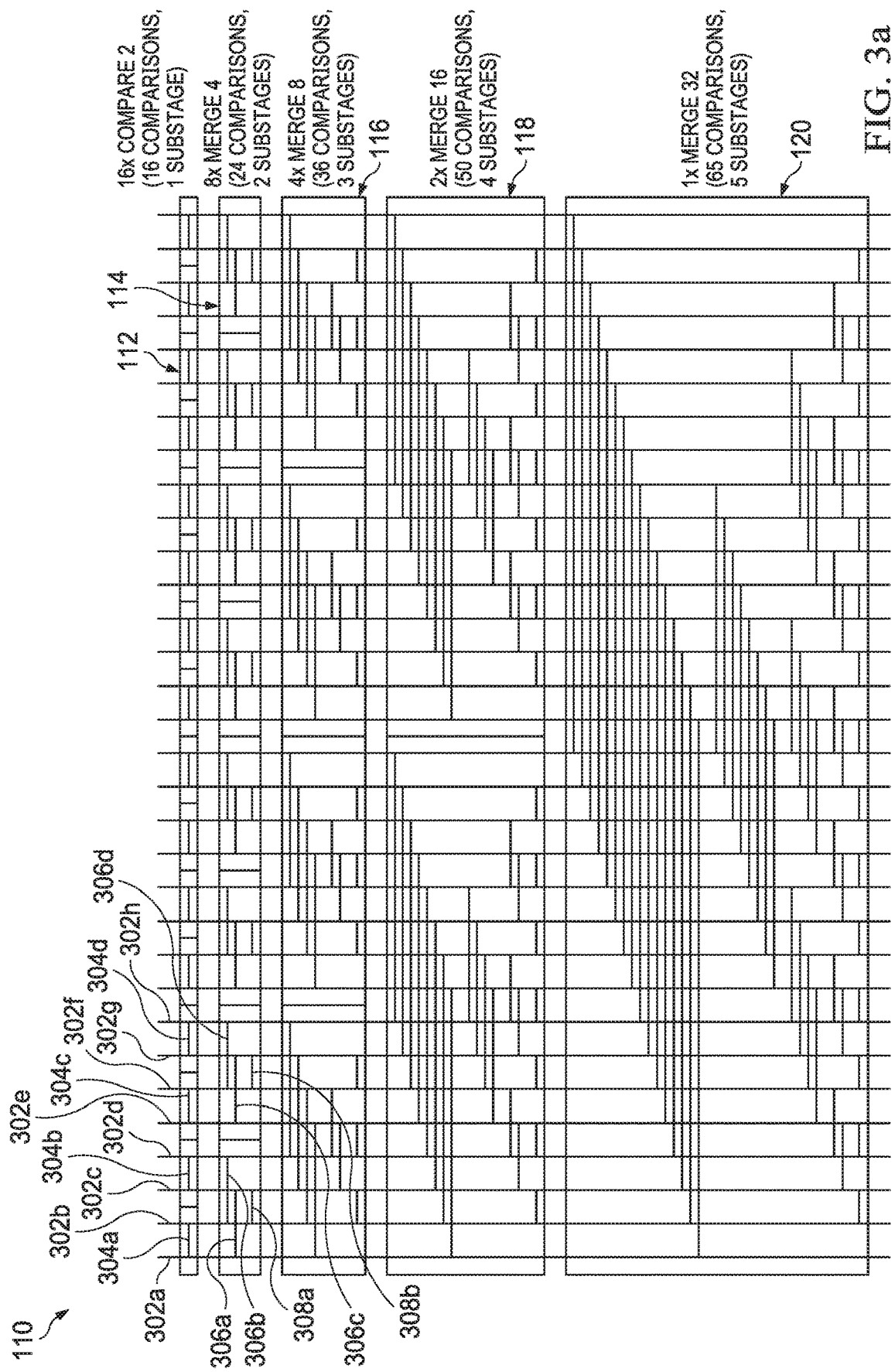
FIG. 3a shows a merge sort network of the merge sort accelerator in accordance with various examples.

FIG. 3a shows an example implementation of the merge sort network 110, including the aforementioned stages 112-120. The vertical lines that run from top to bottom represent elements of the pre-processing output vector 108. For example, lines 302a-h represent the first eight elements of the pre-processing output vector 108. The horizontal lines between elements of the pre-processing output vector 108 represent the comparison of elements that takes place in a given stage 112-120, which may also result in a swap of those elements depending on the result of the comparison.

For example, in the compare 2 stage 112, 304a-d represent the comparisons between elements 302a-b, 302c-d, 302e-f, and 302g-h, respectively. Similarly, in a first sub-stage of the merge 4 stage 114, 306a represents a comparison between elements 302a and 302c, 306b represents a comparison between elements 302b and 302d, 306c represents a comparison between elements 302e and 302g, and 306d represents a comparison between elements 302f and 302h. In a second sub-stage of the merge 4 stage 114, 308a represents a comparison between 302b and 302c, while 308b represents a comparison between 302f and 302g.

As explained above, the stages 112-120 of the merge sort network 110 are configured to be selectively enabled to provide different sorting options. In the example shown in FIG. 1A, the compare 2 stage 112 and the merge 4 stage 114 are enabled, resulting in sorted groups of four adjacent elements. Enabling the merge 8 stage 116 would result in sorted groups of eight adjacent elements, while enabling the merge 16 stage 118 and merge 32 stage 120 would result in sorted groups of 16 adjacent elements and all 32 elements, respectively.

Figure 3B:
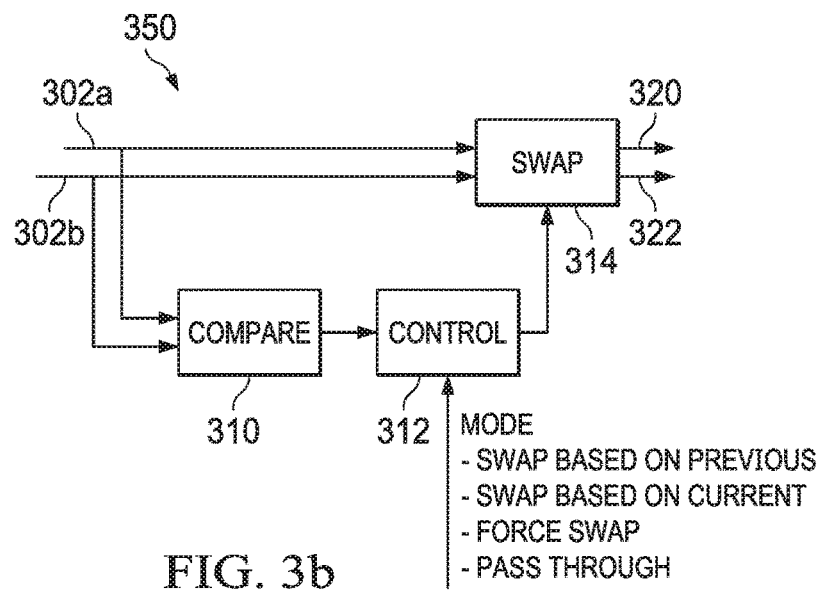
FIG. 3b shows an example of compare-control-swap logic utilized in the merge sort network in accordance with various examples.

FIG. 3b shows an example comparison circuit 350, including the compare block 310 and swap block 314, that implements the comparison operation 304a of FIG. 3a comparing elements 302a-b. Additionally, a control block 312 allows for different instructions to be applied by each stage 112-120 of the merge sort network 110. The control block 312 may receive and—along with the compare block 310 and the swap block 314—implement instructions that govern the functionality of the stages 112-120 of the merge sort network 110. These instructions may include "swap based on previous," "swap based on current," "force swap," or "pass through."

One skilled in the art will appreciate that the merge sort network 110 may be implemented in different ways, and that the implementation of the compare block 310, the control block 312, and the swap block 314 can be varied accordingly. For example, in response to the control block 312 receiving the swap based on current instruction, the control block 312 causes the swap block 314 to swap elements 302a and 302b if the compare block 310 indicates that element 302a is greater than 302b. For example, output 322 of the swap block 314 corresponds to the greater of elements 302a and 302b, while output 320 of the swap block 314 corresponds to the lesser of elements 302a and 302b. Conversely, the swap block 314 would not swap elements 302a and 302b if the 302a is not greater than 302b.

Similarly, in response to the control block 312 receiving the swap based on previous instruction, the control block 312 causes the swap block 314 to swap elements 302a and 302b if the compare block 310 indicated that previously-received element 302a is greater than previously-received element 302b. For example, the output 322 corresponds to element 302a and the output 320 corresponds to element 302b if previously-received 302a was greater than previously-received 302b, while the output 320 corresponds to element 302a and the output 322 corresponds to element 302b if previously-received 302a was not greater than previously-received 302b. The swap based on previous instruction allows, for example, one vector to be sorted by another (i.e., the previously-received vector). For example, if first and second vectors corresponded to weight-height pairs of individuals, the swap based on previous instruction would allow sorting weight-by-height (or vice versa, depending on the ordering of the vectors read into the merge sort accelerator 100).

If the control block 312 receives the force swap instruction, the control block 312 causes the swap block 314 to swap elements 302a and 302b (i.e., to output 322 and output 320, respectively) regardless of the result of the compare block 310. On the other hand, if the control block 312 receives the pass through instruction, the control block 312 causes the swap block 314 to pass elements 302a and 302b through as outputs 320 and 322, respectively. The foregoing assumes that the merge sort network 110 is implemented such that the output 322 is greater than the output 320 (assuming the swap based on current instruction). The merge sort network 110 could alternately be implemented such that the output 320 is greater than the output 322 (assuming the swap based on current instruction), and the above would apply equally but in reverse. The force swap and pass through instructions are implemented the same regardless of direction of the merge sort network 110 implementation.

Referring back to the example of FIGS. 1A and 1B, the merge 8, merge 16, and merge 32 stages 116-120 are not enabled, for example by instructing each stage 116-120 to pass through, and thus a sorted output vector 122 is the result of the merge 4 stage 114. As explained above, the result of the merge 4 stage 122 is sorted groups of four adjacent elements. An accumulator stage 124, which comprises an accumulator vector, receives the sorted output vector 122. For the sake of simplicity, the accumulator stage 124 is depicted as vertical elements shown as "C2," where the '2' represents an element of the accumulator vector and the 'C' represents an element of the sorted output vector 122 received by the accumulator stage 124.

Generally, the accumulator stage 124 builds upon the merge sort network 110, which compares elements in one dimension (e.g., elements in the same row), to allow for comparison of elements in a second dimension (e.g., elements in the same column). Different instructions may be received and implemented by the accumulator stage 124. These instructions may include "keep accumulator vector," "store sorted output vector," "replace accumulator vector with minimum of accumulator vector elements and sorted output vector elements" ("replace with min," for brevity), and "replace accumulator vector with maximum of accumulator vector elements and sorted output vector elements" ("replace with max," for brevity).

In response to the accumulator stage 124 receiving the keep accumulator vector instruction, the accumulator vector will retain the same values, and a subsequent sorted output vector 122 will be made available to the accumulator stage 124 in the following cycle. In response to the accumulator stage 124 receiving the store sorted output vector instruction, the accumulator vector will be replaced with the sorted output vector 122, and a subsequent sorted output vector 122 will be made available to the accumulator stage 124 in the following cycle.

In response to the accumulator stage 124 receiving the replace with max instruction, each element of the accumulator vector is replaced with the maximum of that element and the element of the sorted output vector 122 in the same column, in the example of FIG. 1B. In this way, maximum elements may be identified in two dimensions.

Referring to the example of FIGS. 1A and 1B, in which the feature map in memory 150 is to be analyzed in 3×3 blocks to determine the maximum in each block, the compare 2 and merge 4 stages 112-114 of merge sort network 110 sort each group of four adjacent elements such that the maximum of those four elements is positioned in the farthest-right location of that group. In an alternate example, the merge sort network 110 may be configured to position the maximum elements in the farthest-left locations of groups, and it should be appreciated that this is merely a matter of implementation; however, for the purposes of this example it is assumed that the elements will be arranged left-to-right from least-to-greatest in their respective group, regardless of the size of the group (i.e., regardless of how many stages of the merge sort network 110 are enabled).

Continuing the example of FIG. 1B, when the sorted output vector 122 comprises a first row of a 3×3 block, the instruction provided to the accumulator stage 124 will be to store the sorted output vector 122. At this point, the accumulator vector comprises that sorted output vector 122. In the following cycle, the instruction provided to the accumulator stage 124 will be replace with max, such that each element of the accumulator vector is compared to the corresponding element of the new sorted output vector 122 (i.e., the second row of the 3×3 block), and the accumulator vector is updated to contain the maximum of each comparison. Similarly, in the next cycle, the instruction provided to the accumulator stage 124 will again be replace with max, such that each element of the accumulator vector is compared to the corresponding element of the new sorted output vector 122 (i.e., the third and final row of the 3×3 block), and the accumulator vector is updated to contain the maximum of each comparison.

As one numerical example, assume that after the merge sort network 110, the values of the first four elements of rows 0-2 (i.e., the first three sorted output vectors 122 received by the accumulator sage 124) are: row(0)=[2, 4, 6, 6]; row(1)=[1, 5, 5, 5]; and row(2)=[3, 7, 10, 10]. Of note is that the third element of each row is duplicated according to the pre-processing stage 106, explained above, in order to provide power-of-2 boundaries for comparison in the merge sort network 110. After the accumulator stage 124 receives row(0) as the sorted output vector 122 and the instruction to store the sorted output vector 122, the accumulator vector will be [2, 4, 6, 6]. After the accumulator stage 124 receives row(1) as the sorted output vector 122 and the instruction to replace with max, the accumulator vector will be [2, 5, 6, 6]. Finally, after the accumulator stage receives row(2) as the sorted output vector 122 and the instruction to replace with max, the accumulator vector will be [3, 7, 10, 10]. Thus, the accumulator stage 124 has identified the maximum element of the 3×3 block comprising [2, 4, 6]; [1, 5, 5]; and [3, 7, 10] as the farthest-right element —10—of the accumulator vector.

In response to the accumulator stage 124 receiving the replace with min instruction, each element of the accumulator vector is replaced with the minimum of that element and the element of the sorted output vector 122 in the same column. Although the example of FIGS. 1A and 1B relates to identifying maximum elements, the same concepts may be equally applied to identifying minimum elements in two dimensions.

In FIG. 1B, an accumulator stage output 126 is shown, which can be considered equal to the accumulator vector (denoted by the row of '2' elements in the accumulator stage 124). A post-processing stage 128 receives the accumulator vector as the accumulator stage output 126. The post-processing stage may receive and implement instructions to select accumulator stage output 126 elements, relocate those elements in a post-processing output vector 130, and insert special values in the post-processing output vector 130 as needed. For example, the post-processing stage 128 may receive instructions that mark each input (i.e., each element of the accumulator vector or accumulator stage output 126) as "discard" or "keep," and then sequentially generate the post-processing output vector 130 from either the kept inputs ("keep") or a "special value."

Referring to the example of FIG. 1B, the maximum of each 3×3 block (i.e., the fourth element to the right in each group of four adjacent elements, denoted by 'T') is selected to be kept (denoted by '1' at the top of the post-processing stage 128), while the remaining elements are discarded (denoted by '0' at the top of the post-processing stage 128). Then, the elements of the post-processing output vector 130 are specified as either a special value of 0 (e.g., to implement a 0-padding scheme) or the kept inputs. For example, at the bottom of the post-processing stage 128, the '0' instruction corresponds to inserting the special value, while the '1' instruction corresponds to sequentially generating the output from the kept inputs, which are the 'T' elements in the accumulator stage output 126.

Finally, a store stage 132 receives the post-processing output vector 130 and an instruction that indicates which elements of the post-processing output vector 130 are to be stored. This may be a simple binary decision of either "discard" or "store." As can be seen in FIG. 1B, the first 10 elements of the post-processing output vector 130—which include the eight local maximums and two elements to allow for 0-padding—are flagged to be stored, while the remaining elements of the post-processing output vector 130 are discarded. The store stage 132 subsequently stores the identified elements of the post-processing output vector 130 in output memory 160.

Figure 4A:
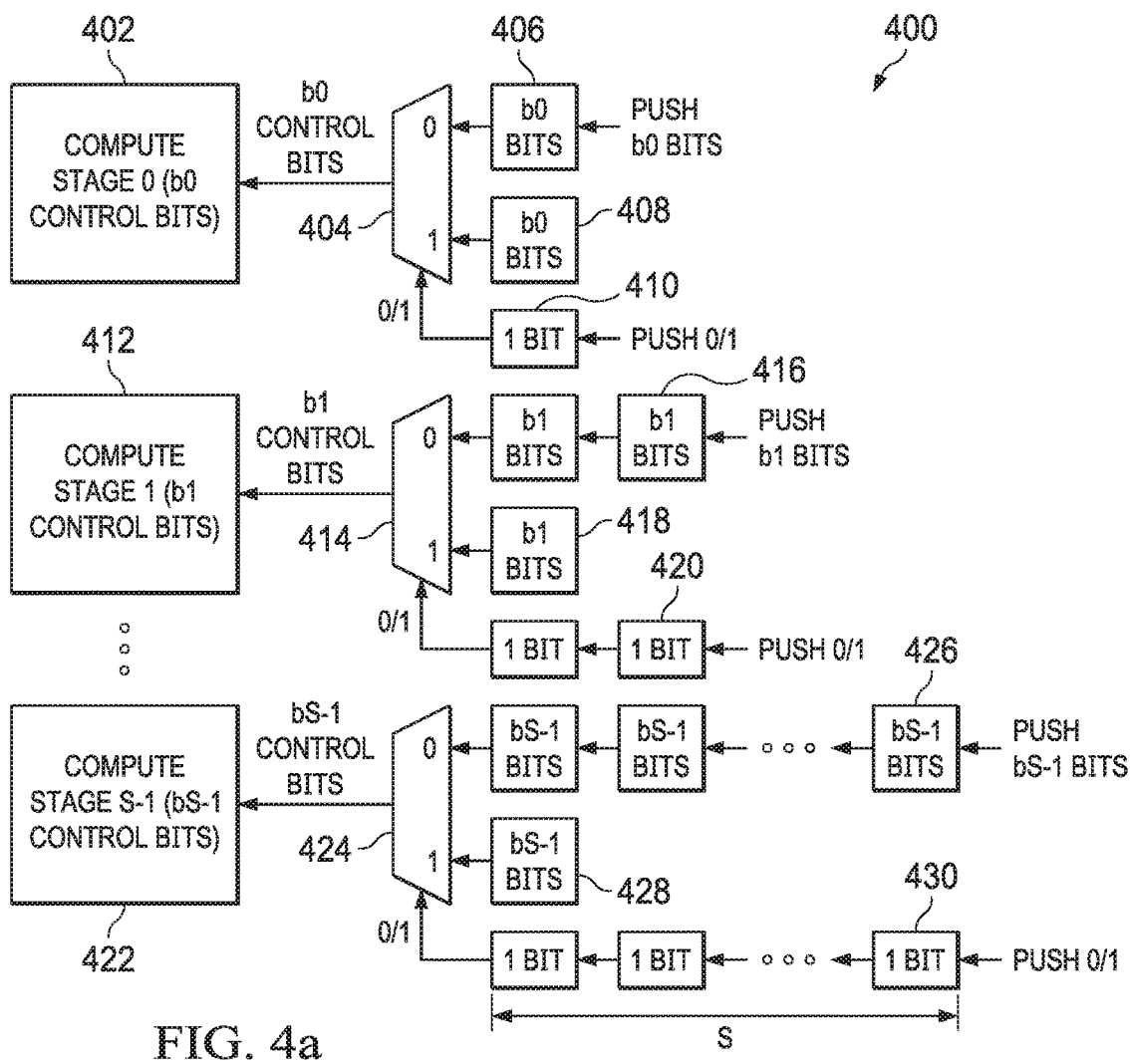
FIG. 4a shows an instruction control section in accordance with various examples.

It should be appreciated that the merge sort accelerator 100 described above is configured to operate in a pipelined fashion. For example, while the pre-processing stage 106, for example, is performing an operation on a particular row or vector of data from memory 150, the load stage 102 is performing an operation on a subsequently-read row or vector of data from memory 150, while the merge sort network 110 (specifically, the compare 2 stage 112) is performing an operation on a previously-read row or vector of data from memory 15. In order to facilitate such pipelined operation, and to provide a straightforward instruction flow, FIG. 4a shows an instruction control section 400 in accordance with examples of the present disclosure.

The instruction control section 400 interfaces with compute stages of the merge sort accelerator 100 described above. In FIG. 4a, the compute stages have been generically labeled as compute stage 0 402, compute stage 1 412, and compute stage S-1 422. For example, the compute stage 0 402 may correspond to the load stage 102, while the compute stage S-1 422 may correspond to the store stage 132. For each compute stage 402, 412, 422, the instruction control section 400 comprises an associated multiplexer ("mux" or, collectively, "muxes") 404, 414, 424, respectively. These muxes 404, 414, 424 are provided with input instruction bits 406, 416, 426, along with default instruction bits 408, 418, 428. Further, the muxes 404, 414, 424 are also provided with an instruction selection bit 410, 420, 430.

The input instruction bits 406, 416, 426 are provided to instruction queues for the appropriate stage, where the depth of each instruction queue matches the depth of its associated stage, so that the instruction associated with a particular row or vector of data is provided to a given compute stage 402, 412, 422 at the same time that the particular row or vector of data reaches that compute stage 402, 412, 422. For example, an instruction for compute stage 1 412 and associated with a row or vector of data would be delayed such that that instruction reaches compute stage 1 412 (i.e., is provided to the mux 414, and selected by the instruction selection bit 420) at the same time that row or vector of data is provided to compute stage 1 412. The instruction queue may be implemented as a shift register as one example.

The default instruction bits 408, 418, 428 allow a fixed instruction to be programmed for each stage, which can then be selected with just a single bit (i.e., the instruction selection bit 410, 420, 430). This allows for a simplified instruction set to be utilized in situations where, for example, the merge sort accelerator 100 is tasked with performing a regular or repetitive set of functions. The example of FIGS. 1A and 1B, in which analysis is of 3×3 blocks with stride by 2, for max pooling, is one example of such a regular pattern.

Referring briefly to FIG. 5, a table 500 explaining a sample instruction set is shown in accordance with examples of the present disclosure. Certain instructions in the table 500 are described in shorthand relative to their introductions above. Each row in the table 500 corresponds to a compute stage of FIGS. 1A and 1B, and the operation column highlights that stage. For example, the first row or compute stage 0 corresponds to the pre-processing stage 106; while the seventh row or compute stage 6 corresponds to the accumulator stage 124. The control bits column specifies the size of the instruction required for that particular compute stage, while the notes column explains in further detail how the number of control bits is determined.

Referring to the pre-processing stage of table 500, and as explained above, there are 32 elements received from the load stage 102. For each element of the pre-processing output vector (i.e., also 32 elements), the pre-processing stage is instructed as to whether that element is a "previous" element of the input vector, a "current" element of the input vector, a "next" element of the input vector, or a "special value," which can be specified with 2 bits. Thus, for the pre-processing stage, 32 elements*2 bits=64 bits are required per row or vector of data.

Referring to the compare 2 stage of table 500, and as explained above, there are 16 comparisons that take place on the 32 elements received from the pre-processing stage 106. For each of the comparisons, the compare 2 stage is instructed as to whether that comparison is a swap based on "previous," a swap based on "current," a "force swap," or "pass through," which can also be specified with 2 bits. Thus, for the compare 2 stage, 16 comparisons*2 bits=32 bits are required per row or vector of data.

As an additional example, referring to the post-processing stage of table 500, there are determinations on the input side as to whether to "discard" or "keep" each of the 32 elements of the accumulator vector. Similarly, there are determinations on the output side as to whether to insert a "kept" element or a "special value." Both the input and output sides of the post-processing stage can thus be specified with 2 bits. Thus, for the post-processing stage, 32 elements*1 bit* (input+output sides)=64 bits are required per row or vector of data.

Figure 4B:
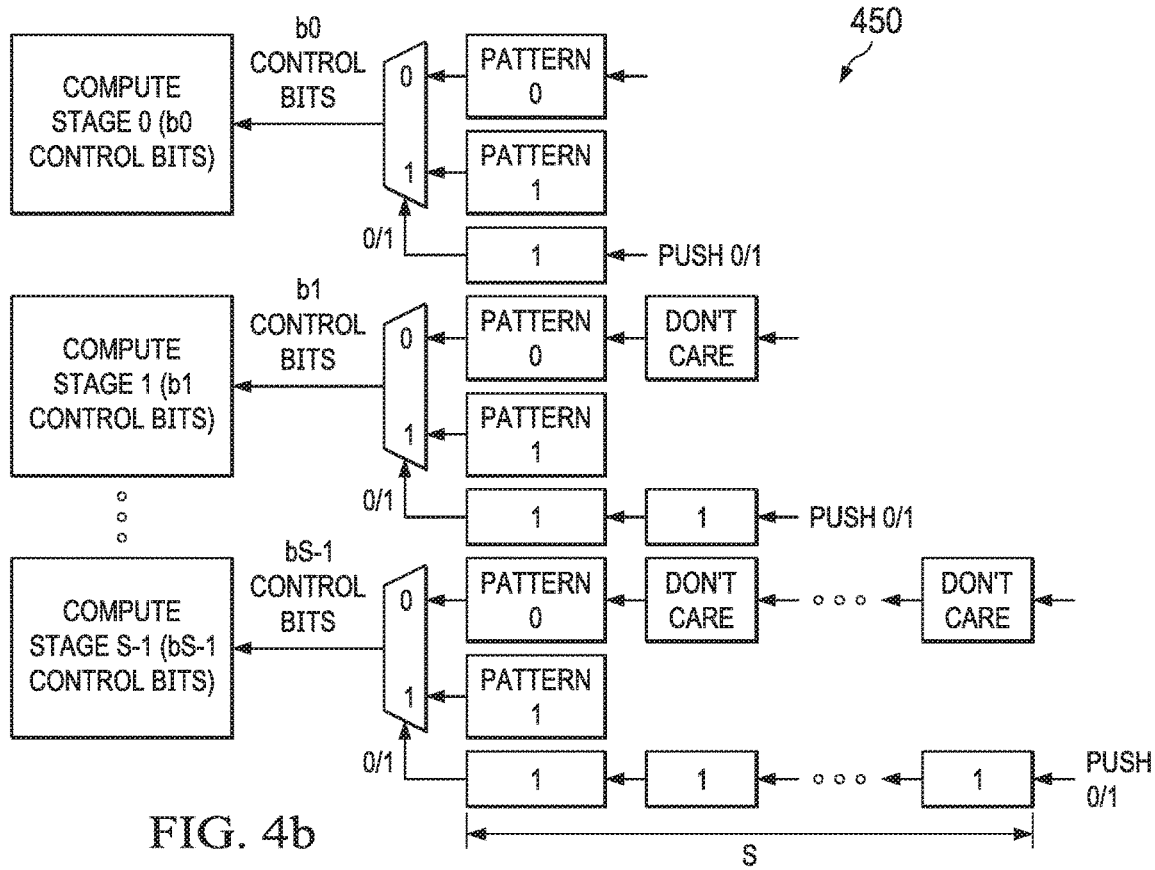
FIG. 4b shows an example of the instruction control section for simple compute control for regular patterns in accordance with various examples.

Turning back to FIG. 4b, an example implementation 450 of a reduced instruction set for regular patterns of data analysis is shown. It should be appreciated that this is just one of myriad such examples, all of which are within the scope of the present disclosure. The example implementation 450 may be applicable to the 3×3 example described with respect to FIGS. 1A and 1B. In the implementation 450, each of the muxes is supplied with only two different instruction patterns, and the remainder of the instruction queues become "don't cares." For certain, regular patterns, only two instructions are needed per stage; thus, those two instructions are pre-programmed as inputs to the muxes, and subsequently only a single bit per stage is required to select the appropriate instruction. Referring back to FIG. 1A, for example, the instruction for the pre-processing stage 106 will always be the pattern explained in FIG. 2a, in order to expand groups of three elements to a power-of-2 boundary. For each stage in the merge sort network 110, the instruction will either be to "swap based on current" or "pass through" (i.e., in the case of disabled stages 116-120), which can be pre-programmed as inputs to the appropriate mux, and then subsequently selected with a single bit. The remainder of the stages are similarly limited to, at most, two required instructions to implement the example described in FIGS. 1A and 1B, and thus a greatly reduced instruction set may be employed.

Figure 4C:
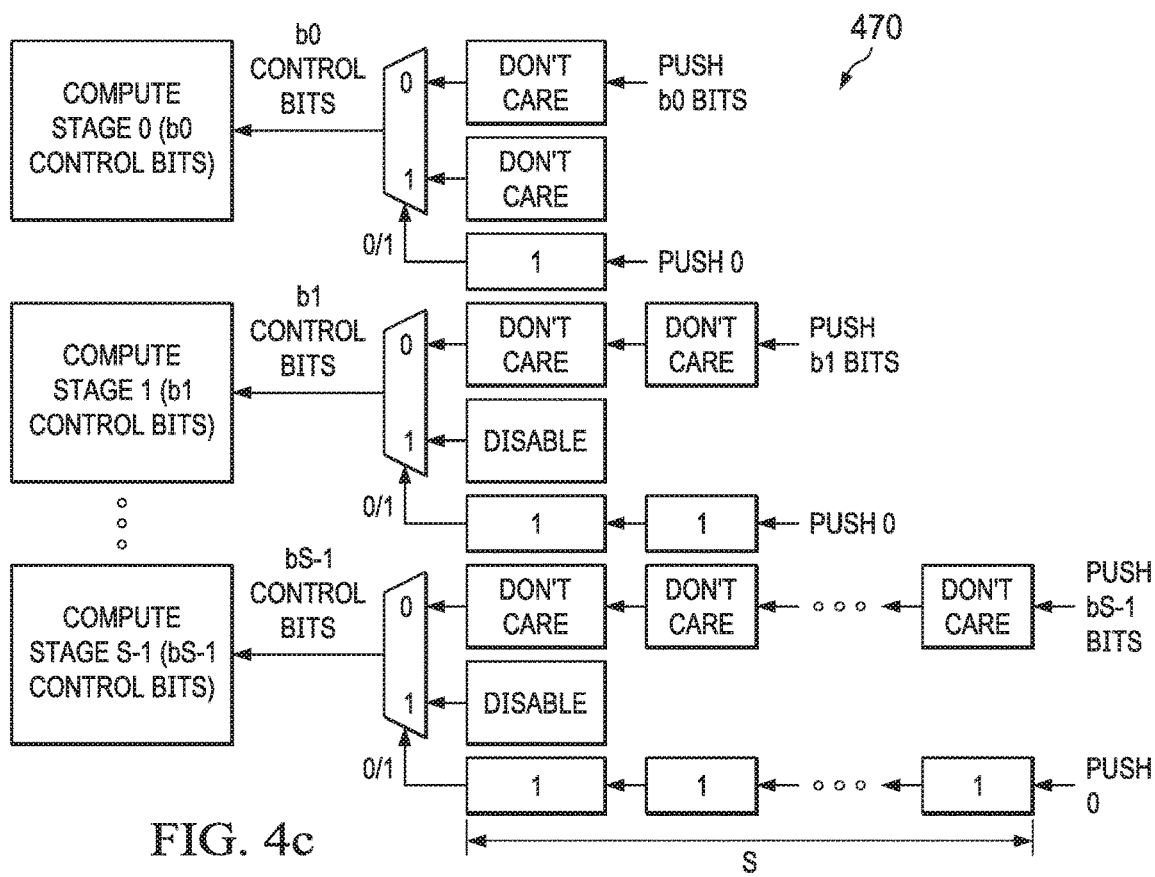
FIG. 4c shows another example of the instruction control section for full compute control for irregular patterns.

Turning to FIG. 4c, an example implementation 470 of a full instruction set for irregular patterns of data analysis. The implementation 470 differs from 450, described above, in that now instructions are pushed into their respective instruction queues on a per-row/vector basis, along with an instruction selection bit to select those pushed instructions. In this example, the pushing of an instruction into its respective queue is what causes the advancement of the queue. Thus, the implementation 470 enables a specific, per cycle processing of each data row or vector, despite requiring a much larger instruction size.

Figure 6:
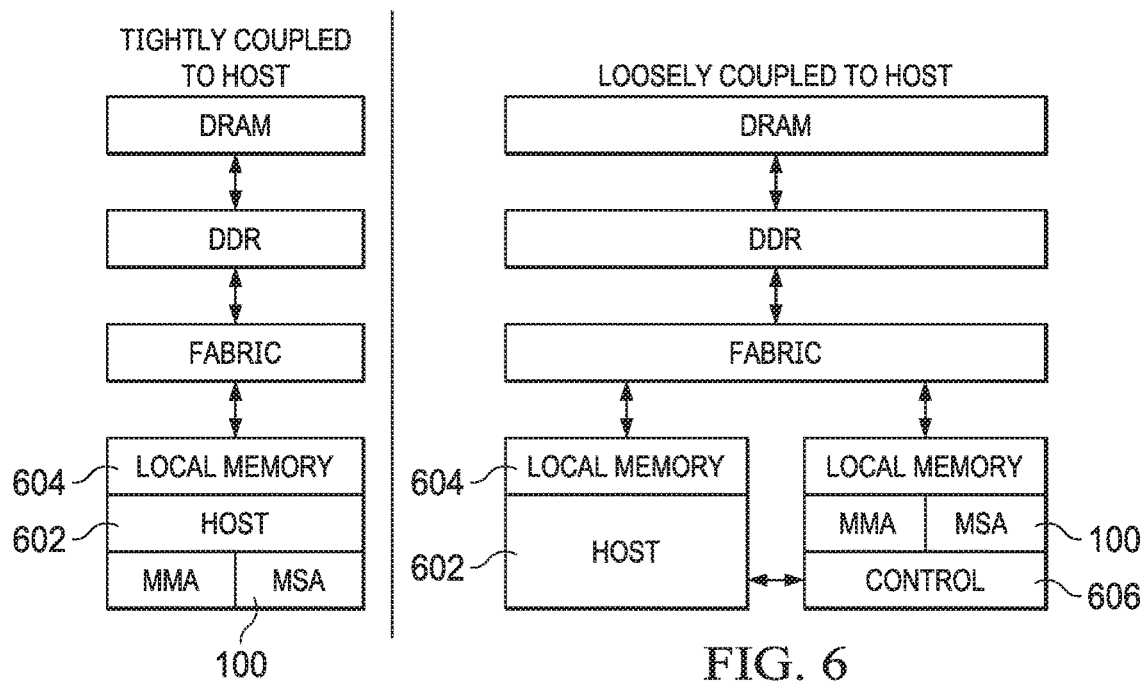
FIG. 6 shows a block diagram of two example integrations of the merge sort accelerator into a computing device.

FIG. 6 shows two examples of how the merge sort accelerator 100 may be coupled to a host processor 602 and its local memory 604. In a first example 600, the merge sort accelerator 100 is tightly coupled to the host processor 602 and its local memory 604, and thus can be accessed directly by the host processor 602. In a second example 601, the merge sort accelerator 100 is loosely coupled to the host processor 602 and its local memory 604, and thus is accessed by the host processor 602 through an intermediate controller 606.

Figure 7:
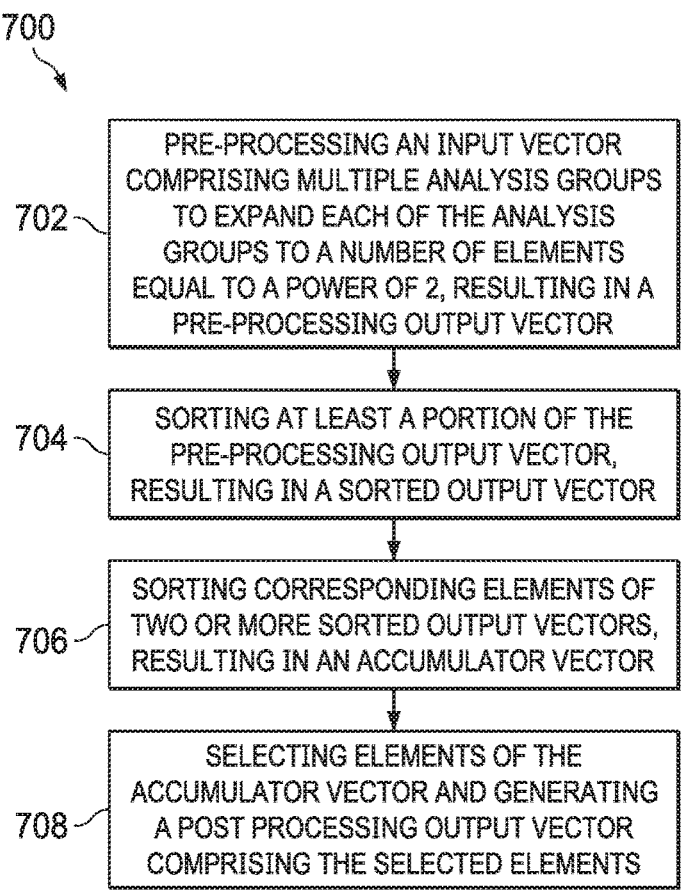
FIG. 7 shows a flow chart of a method of merge sort acceleration in accordance with various examples.

FIG. 7 shows a flow chart of a method 700 for accelerating mathematical operations using a merge sort accelerator in accordance with examples of the present disclosure. The method 700 begins in block 702 with pre-processing an input vector having multiple analysis groups to expand the analysis groups to a number of elements equal to a power of 2. As explained above, where analysis groups include three elements (e.g., for a 3×3 block of data), these groups may be expanded to a power-of-2 boundary of four elements, for example by repeating one of the elements in each analysis group. The result of this pre-processing step is a pre-processing output vector.

The method 700 continues in block 704 with sorting at least a portion of the pre-processing output vector, which results in a sorted output vector. As explained above, various stages of the merge sort network 110 may be selectively enabled to provide different levels of sorting of the pre-processing output vector. For example, if only the compare 2 stage 112 is enabled, then only pairs of adjacent elements of the pre-processing output vector will be sorted. On the other hand, if all stages of the merge sort network 110 are enabled, then the pre-processing output vector will be fully sorted.

The method 700 continues in block 706 with sorting corresponding elements of two or more sorted output vectors, which results in an accumulator vector. In this way, multiple sorted output vectors can be compared and have their corresponding elements sorted, resulting in two-dimensional sorting. For example, in block 706 a two-dimensional local maximum or minimum could be identified in a 3×3 block of data, as is shown in FIG. 1A.

Finally, the method 700 concludes in block 708 with selecting elements of the accumulator vector and generating a post-processing output vector comprising the selected elements. For example, each local maximum of a 3×3 block as in FIG. 1A may be selected to be kept, and the post-processing output vector is generated including those selected elements and, in some cases, special values such as 0s to implement a 0-padding scheme.

In the foregoing discussion and in the claims, reference is made to a merge sort accelerator including various sections, stages, and networks. It should be appreciated that these sections, stages, and networks, as the case may be, correspond to hardware circuitry, for example implemented on an integrated circuit (IC). Indeed, in at least one example, the entire merge sort accelerator is implemented on an IC.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
 a memory:
 a processor;
 an accelerator coupled to the memory and the processor, the accelerator configured to:
  access an input vector from a memory;
  receive, from the processor, a pre-processing instruction that indicates, for each element of a pre-processing output vector, a mapping from an element of the input vector to the pre-processing output vector; and
  generate the pre-processing output vector based on the pre-processing instruction and the input vector;
  receive, from the processor, a sorting instruction that indicates a first sorting and a second sorting to be applied; and
  generate a sorted output vector based on the sorting instruction and the pre-processing output vector;
  receive, from the processor, an accumulator instruction that indicates whether to:
   replace an accumulator vector with the sorted output vector; or
   compare the sorted output vector with the accumulator vector and replace the accumulator vector with a result of the comparison; and
  update the accumulator vector based on the accumulator instruction and the sorted output vector; and
  receive, from the processor, a post-processing instruction that indicates a selection of elements of the accumulator vector and a position in a post-processing output vector for each of the selected elements; and
  generate the post-processing output vector based on the instruction and the accumulator vector.

2. The system of claim 1 wherein the accelerator is further configured to provide a vector from a memory to the pre-processing stage as the input vector.

3. The system of claim 1 wherein the accelerator is further configured to:
 receive an instruction that indicates elements of the post-processing output vector to be stored; and
 store the indicated elements of the post-processing output vector.

4. The system of claim 1 wherein:
 the pre-processing instruction specifies for each element of the pre-processing output vector whether that element of the pre-processing output vector is a previous element of the input vector, a current element of the input vector, a next element of the input vector, or a special value.

5. The system of claim 1 wherein the first sorting swaps elements of the pre-processing output vector based on a comparison of those elements of the pre-processing output vector or based on a comparison of associated elements of a previous pre-processing vector.

6. The system of claim 1 wherein the post-processing instruction further indicates one or more positions in the post-processing output vector for insertion of a special value.

7. A method comprising:
 receiving an input vector;
 receiving a pre-processing instruction that indicates, for each element of a pre-processing output vector, a mapping from an element of the input vector to the pre-processing output vector;
 generating the pre-processing output vector based on the pre-processing instruction and the input vector;
 receiving a sorting instruction that indicates a first sorting and a second sorting to be applied;
 generating a sorted output vector based on the sorting instruction and the pre-processing output vector;
 receiving an accumulator instruction that indicates whether to:
  replace an accumulator vector with the sorted output vector; or
  compare the sorted output vector with the accumulator vector and replace the accumulator vector with a result of the comparison;
 updating the accumulator vector based on the accumulator instruction and the sorted output vector;

receiving a post-processing instruction that indicates a selection of elements of the accumulator vector and a position in a post-processing output vector for each of the selected elements; and generating the post-processing output vector based on the instruction and the accumulator vector.

8. The method of claim 7 further comprising loading a vector from a memory to be pre-processed as the input vector.

9. The method of claim 7 further comprising storing only selected elements of the post-processing output vector.

10. The method of claim 7 wherein the sorting results in a fully sorted output vector.

11. The method of claim 7, further comprising:

receiving an instruction that indicates elements of the post-processing output vector to be stored; and storing the indicated elements of the post-processing output vector.

12. The method of claim 7 wherein the pre-processing instruction specifies for each element of the pre-processing output vector whether that element of the pre-processing output vector is a previous element of the input vector, a current element of the input vector, a next element of the input vector, or a special value.

13. The method of claim 7 wherein the first sorting indicates to swap elements of the pre-processing output vector based on a comparison of those elements of the pre-processing output vector or based on a comparison of associated elements of a previous pre-processing vector.

14. The method of claim 7 wherein the post-processing instruction further indicates one or more positions in the post-processing output vector for insertion of a special value.

\* \* \* \* \*